UNITED STATES PATENT OFFICE.

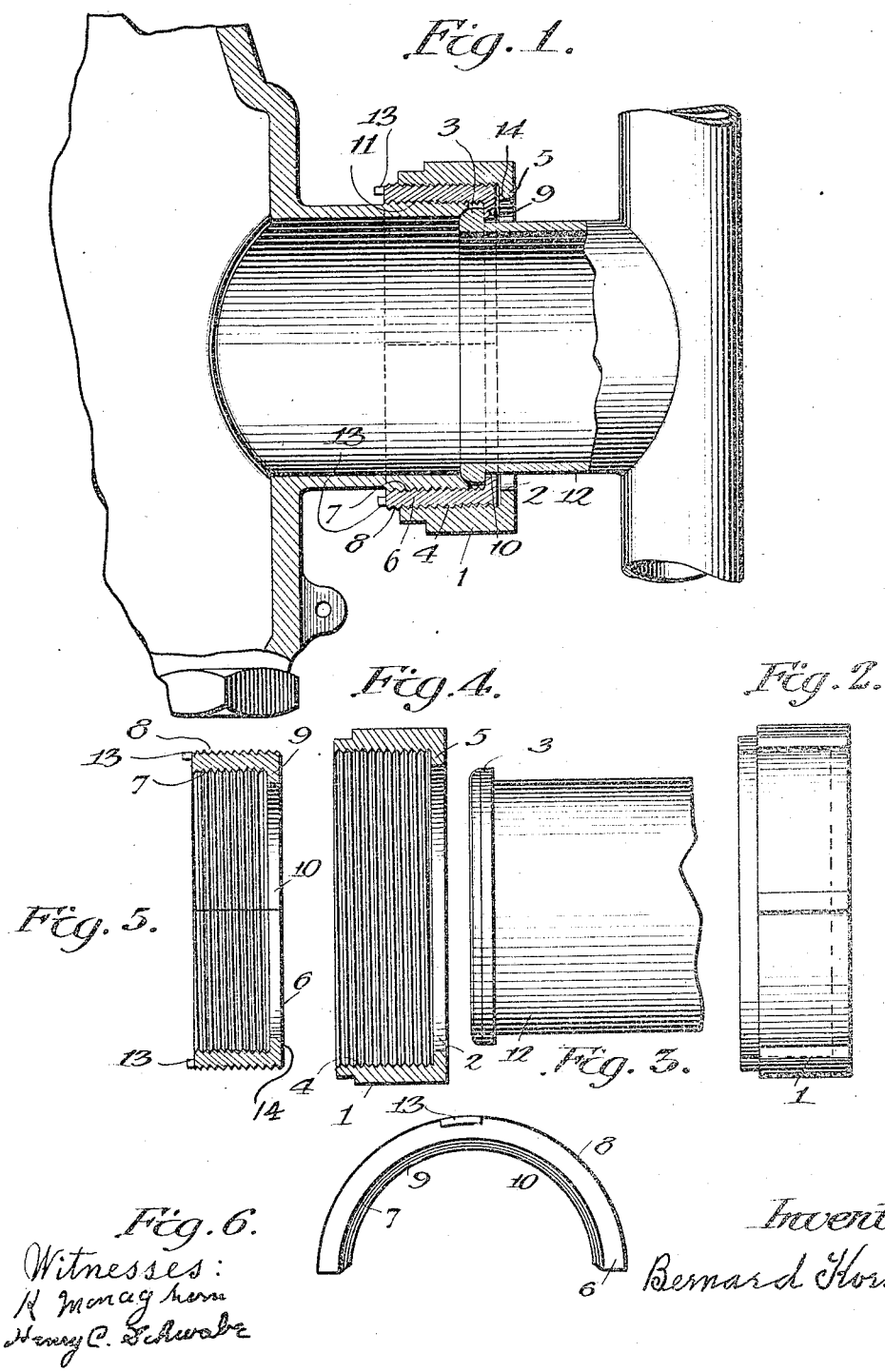

BERNARD KORTAS, OF CHICAGO, ILLINOIS.

PIPE-COUPLING NUT.

1,244,100.

Specification of Letters Patent.

Patented Oct. 23, 1917.

Application filed July 5, 1916. Serial No. 107,674.

*To all whom it may concern:*

Be it known that I, BERNARD KORTAS, a citizen of the United States, residing at Chicago, in the county of Cook and the State of Illinois, have invented new and useful Improvements in Pipe-Coupling Nuts, of which the following is a specification.

My invention relates to the class of pipe coupling nuts used for drawing together joints or unions having male and female members secured to the ends of pipes or tubes, or where the male member is secured to the ends of pipes and the female member is a part of a valve or injector, such as are used on steam boilers.

The object of my invention is to provide a pipe coupling nut which can be conveniently placed in position for practical use, over and behind the projecting flange of the male member of the union, and taken off from this position, when the male member of the union is secured to a line of piping, without detaching the opposite end of pipe from the part to which it is connected. My invention is specially useful for coupling brass pipe to injectors such as are used on steam boilers, where the male members of the unions are brazed onto the pipes. To replace an ordinary worn out nut in such a case with another one like it, requires a fire and the services of a coppersmith, to heat and so disconnect the male member of the union, and then after the ordinary nut is placed over the pipe, to braze the male member of the union in its proper position again. It will be seen that with my invention it is not necessary to do this, for my improved pipe coupling nut can be conveniently placed in position for practical use over the projecting flange of the male member of the union. It is simple in construction, easy to assemble, and hence very economical.

Referring to the drawings—

Figure 1 is a longitudinal section view of a pipe coupling nut constructed in accordance with my invention, showing it coupling a section of pipe to an injector.

Fig. 2 is a side view of the casing or socket of my invention, showing the aperture dotted in.

Fig. 3 is a side view of the male member of a union used for connecting large copper pipes.

Fig. 4 is a sectional view of the interior surface of the casing or socket, showing inside screw thread, and the inwardly turned annular lip or flange.

Fig. 5 is a section of the longitudinally divided reducer showing the inside and also a part of the external screw thread, and the lugs which are used to more easily screw it in or out of the casing.

Fig. 6 is an end view of one of the parts of the split reducer or divided bushing, showing the inwardly turned annular lip or flange, and also the lug.

Similar numerals refer to similar parts throughout the several views.

The casing is of a perimeter 1 adapted for the use of a spanner wrench, and has an aperture 2 large enough to pass over the flange of the male member of the union 3 and a threaded recess 4 enlarged therefrom, providing the annular lip or flange 5 around the aperture at the bottom of the recess.

The split reducer or divided bushing 6 may be of any required number of sections, but preferably of two equal parts or halves. These halves are machined while in one piece and split afterward. It is obvious that when the two halves are properly placed together, the inside and outside screw threads 7 and 8, and the flange and aperture 9 and 10 will be continuous.

The inside screw thread 7 of the split reducer is of a size to engage the external thread 11 of the female member of the union, which in Fig. 1 is shown as part of an injector.

The outside screw thread 8 of the split reducer is of a size to engage the inside screw thread 4 of the casing.

The aperture at the flange end 10 of the split reducer is of a size such that when both halves are placed together behind the flange of the male member of the union 12 it will fit loosely around said flange.

It is obvious that when the two halves 6 of the split reducer are placed in the above position that the inwardly turned annular flange 9 of the reducer overlaps the projecting flange 3 of the male member of the union.

The lugs 13 of which there may be any required number, but preferably two, one on the rim of each half of the split reducer are for the purpose of more easily screwing the reducer in or out of the casing.

When placing my improved pipe coupling nut in position for practical use, while the male member of the union is screwed to a line of piping, I place the casing—flange 5 first—over the projecting flange 3 of the male member of the union. Next I place the two halves 6 of the split reducer,—flange 9 first—over and behind the projecting flange 3 of the male member of the union. Then I press them together and at the same time pull forward so that the flange 9 of the split reducer engages the projecting flange 3 of the male member of the union. This act will adjust the two halves, and the screw threads and flange now being continuous are ready to be screwed into the threaded recess of the casing. This done, the nut is assembled. It is now ready to be screwed onto the female member of the union in the ordinary way, a suitable wrench being used for drawing the joints tightly together.

Fig. 1 shows my improved pipe coupling nut in position, coupling two joints together. 5 shows the annular flange of the casing engaging the shoulder 14 of the split reducer. 9 shows the annular flange of the split reducer engaging the projecting flange 3 of the male member of the union.

To uncouple the pipe, and to take the nut off from behind the flange 3 of the male member of the union, reverse the above described operation.

I am aware that prior to my invention pipe couplings have been made the nuts of which could be placed in position over the flange of the male members of unions, I therefore do not claim to be the first to accomplish this with my invention: but

I claim:

In a pipe coupling nut an outside casing, and a longitudinally divided reducer, the outside periphery of said reducer being screw threaded and having lugs on its rim, to enable it to be screwed in or out of the casing with ease, the inside periphery of said reducer having means for coupling ends of pipes.

In testimony that I claim the foregoing as my own I have hereto affixed my signature in the presence of two witnesses.

BERNARD KORTAS.

Witnesses:
　HENRY C. SCHWABE,
　KATE MONAGHAN.

Copies of this patent may be obtained for five cents each, by addressing the "Commissioner of Patents, Washington, D. C."